Aug. 23, 1938.  W. B. BARNES  2,127,637
OVERDRIVE WITH SUN GEAR RELEASE
Filed April 16, 1936  3 Sheets-Sheet 1

INVENTOR.
William B. Barnes,
BY
Hood + Hahn.
ATTORNEYS.

Aug. 23, 1938.   W. B. BARNES   2,127,637
OVERDRIVE WITH SUN GEAR RELEASE
Filed April 16, 1936   3 Sheets-Sheet 2

INVENTOR.
William B. Barnes
BY
Hood + Hahn.
ATTORNEYS.

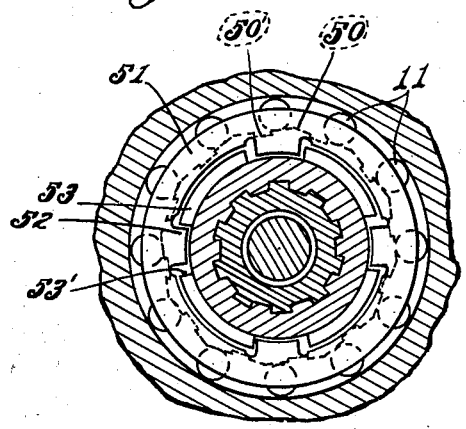
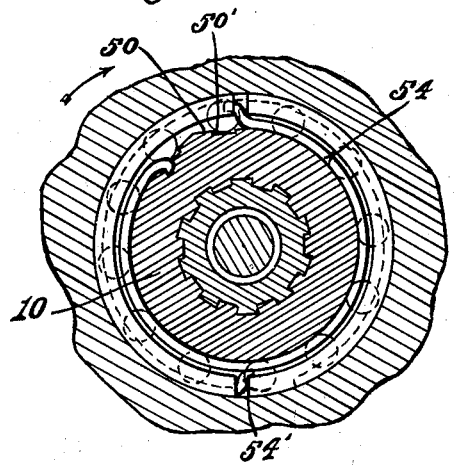
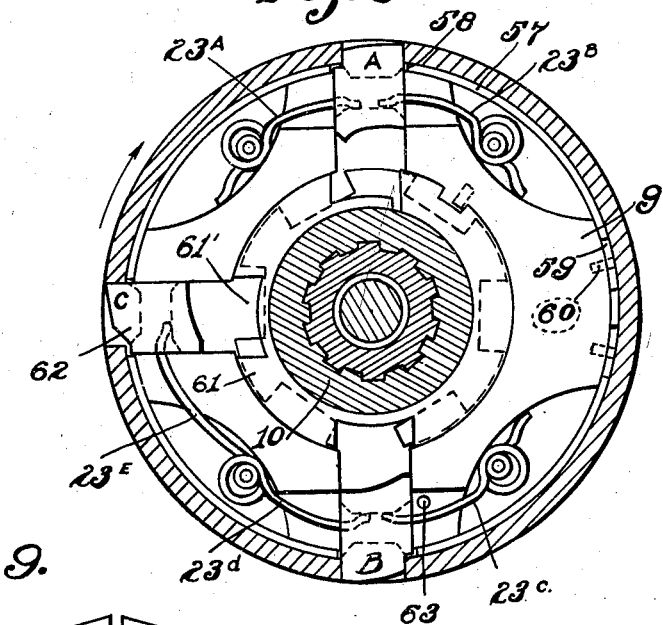
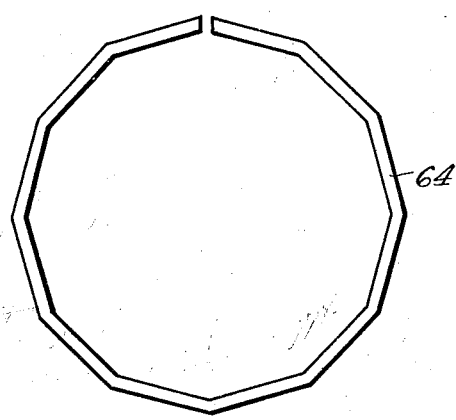

Patented Aug. 23, 1938

2,127,637

UNITED STATES PATENT OFFICE 2,127,637

OVERDRIVE WITH SUN GEAR RELEASE

William B. Barnes, Indianapolis, Ind.

Application April 16, 1936, Serial No. 74,622

17 Claims. (Cl. 74—260)

My invention relates to improvements in automobile transmissions and more particularly to that type of transmission which has become known in the art as an overdrive transmission.

In certain of the commercial forms of overdrive transmissions, there is provided an overdrive gearing adapted to be thrown into operative relation for the purpose of establishing an overdrive speed for the driven or propeller shaft when the speed of the driving or driven shaft reaches a predetermined point. There are instances when this type of overdrive is used where it is desirable and advantageous to reestablish direct drive between the driving and driven shafts without dropping the speed of these shafts below the critical point at which the overdrive has been set to automatically operate, and my invention primarily relates to mechanism for accomplishing this result without undue manipulating effort on the part of the operator.

For the purpose of disclosing my invention, I have illustrated an embodiment thereof in the accompanying drawings, in which:

Figs. 6 and 7 are detail sectional views of the overrunning clutch showing more particularly the construction thereof;

Fig. 8 is a detail sectional view of the modification of the automatic clutch for establishing an overdrive; and Fig. 9 is a side elevation of the loading ring.

Figure 1:
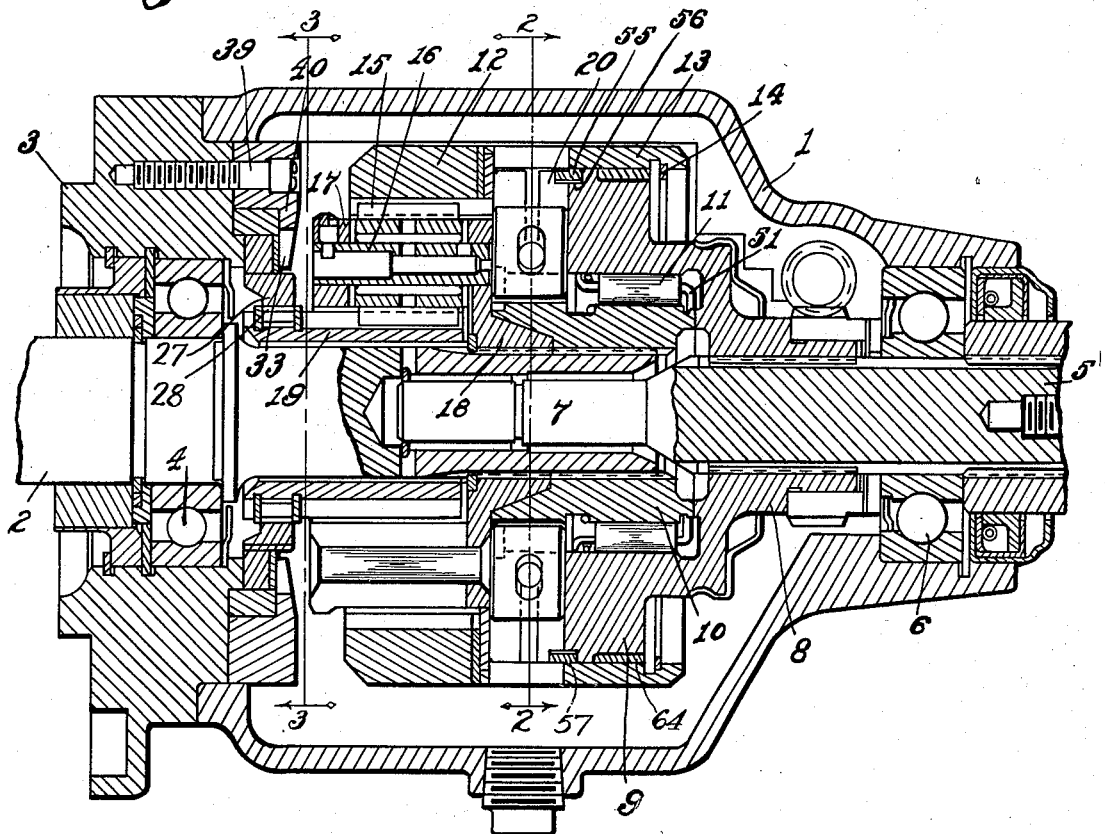
Fig. 1 is a longitudinal section of a transmission embodying my invention.

In the embodiment of the invention illustrated, the overdrive transmission is of the planetary type and is enclosed within a suitable casing 1. A driving shaft 2 projects into the casing through the front wall 3 thereof, being supported in suitable ball bearings 4. This driving shaft 2, as a rule, constitutes a shaft of the usual commercial type of transmission, having the three speeds forward and one reverse drive. A driven or propeller shaft 5 extends into the rear end of the casing 1 being supported by ball bearings 6 and having its end 7 piloted in a recess in the rear end of the driving shaft 2. A sleeve 8 surrounds and is splined on the driven shaft 5 and this sleeve supports an overhanging head 9, the inner periphery of which forms one member of an overrunning clutch. The opposite or cammed member 10 of the overrunning clutch is splined on the end of the driving shaft 2, and suitable wedging rollers 11 are interposed between the two members of the clutch.

The planetary gearing for establishing the overspeed drive comprises a ring gear 12 having an annular extension 13 rotatably mounted on and surrounding the head 9, this extension, and the ring gear 12, being maintained in position on the head through the medium of split rings 14 fitting within suitable annular internal grooves and embracing the head 9. The ring gear is adapted to mesh with a plurality of planet pinions 15 mounted on suitable pinion shafts 16 in turn supported in a pinion gage 17, one end member 18 of which is splined on the end of the driving shaft 2. These pinions, in turn, mesh with a sun gear formed on a sleeve 19 surrounding the driving shaft 2 and held against rotation under normal conditions in a manner more fully hereinafter described.

Mounted within radial slots 20 formed in the face of the head 9, is a pair of radially displaceable engaging dogs 21. These dogs are biased in their inward direction and into a position to cause them to engage in recesses 22 formed in the periphery of the member 10 which, it will be remembered, is splined to the driving shaft, by means of suitable springs 23.

With so much of the structure as described, and assuming that the sun gear on the sleeve 19 is held against rotation with the dogs 21 in their retracted position and engaging in the recesses 22, a direct drive will be established from the driven shaft 2, through the member 10 and by means of the dogs 22 to the head 9 which is splined on the shaft 5. As soon as the speed of the driven shaft reaches a predetermined point, centrifugal force, acting on the dogs 29, will overcome the pressure of the springs 23, causing the dogs to move radially outward. Bearing in mind, however, that the sun gear is stationary and that the pinion gage is being driven from the driving shaft 2 through the connecting member 18, the ring gear and the annular extension 13 will be driven faster than the head 9 and, therefore, the slots 25 in the sleeve portion 13 will be rotating past the dogs 21 faster than the rotative movement of the dogs. Under these circumstances, with the dogs of the construction shown in the accompanying drawings, the dogs will not engage in the slots 25 even though centrifugal force tends to move them in engaging position. However, when the operator removes his foot from the accelerator of the automobile, thereby permitting the shaft 2, which is driven from the engine, to drop down in speed, the slots 20 will eventually reach a synchronization point with the dogs 21, or at least the relative movement is so slight as to make no material difference and the dogs can then engage in the slots 25. With the dogs engaged in the slots 25 and out of engagement of the recesses 22, the ring gear 12 will be locked to the head 9 and an overspeed drive will be established through the planetary gearing, between the shafts 2 and 5, and the direct drive between these shafts is disconnected.

Due to the interposition of the overrunning clutch between the shafts, direct driving connection between the shafts is never wholly disconnected, because even though the dogs 21 may be disengaged from the recess 22, the overrunning clutch will establish a direct one-way drive between the shafts.

The sun gear sleeve is held stationary against rotation by a releasable mechanism which may be caused to automatically release by simply modifying the relative speeds between the shafts 5 and 2. To this end, I provide a disc 26, the hub 27 of which has internal teeth 28 which are adapted to mesh with the teeth on the sun gear 9. Relative axial movement between the disc 26 and the sleeve 19 is prevented by split rings 29 which fit within annular grooves in the teeth of the sleeve 19 and on either side of the hub 27. This disc is provided on its periphery with a plurality of notches or recesses 30 which are adapted to receive a radial movable dog 31. This dog is carried in a radial slot formed in a ring 32 surrounding the disc 26 and having an overhanging flange portion 33 overhanging the disc. This ring is provided with a series of radial abutment portions 37 between which are interposed stop blocks 38 which stop blocks, in length, are shorter than the distance between the abutments 37. These blocks which are segmental in form, are secured by suitable securing means, as screws 39, to the end wall 3 of the casing, and are, therefore, held against rotative movement, and these stop blocks are provided with overhanging flanges 40 which overhang the face of the ring 32. By this arrangement, axial displacement of the ring 32 is prevented and by the overhanging nose 33 on the ring 32, axial displacement of the disc 26 is prevented. Fitting within suitable recesses in the ends of the abutment or stop blocks, are shock absorbing springs 41 which are interposed between the walls of the abutments 37 and the end walls of the stock blocks 38.

The radially movable dog 31 is provided at its lower end with an engaging portion 42 which, when the dog is itself in retracted position, is adapted to engage in one of the notches 30. This dog is also provided on its rear face with a cam 43 adapted to cooperate with a stationary pin 44 fastened in the end wall 3 of the casing, which pin is provided with a suitable roller 45 to reduce the friction between the cam surface 43 and the pin 44.

The dog is biased in its engaging position through the medium of a radially movable stem 46 which projects into a housing 47 secured on the exterior of the casing 1 and has bearing thereon one end of a coiled spring 48, the opposite end of which bears against an adjustable screw-threaded nut 49 whereby the tension of the spring may be varied.

The spacing between the stop members 38 and the abutments 37 is such as to permit of a rotative movement of the gear plate retainer ring 32 of about six degrees and the mounting of the retainer ring on the sun gear disc 26 is such that there is a frictional drag between the ring and the disc which would tend to cause the ring to rotate with the disc until stopped by the abutments or stops 38. Assume that an overspeed drive has been established through the planetary gear in the manner heretofore described, and assume that the operator of the vehicle desires to establish a direct drive between the driving shaft 2 and the driven shaft 5 without dropping the speed of the shafts or of the vehicle below the point where the dogs 21 will be retracted by the springs 23. For the purpose of illustration, we will assume that the dogs 20 are set to engage and establish the overspeed drive when the vehicle is traveling at or above forty miles per hour. We will assume that the vehicle is traveling at fifty miles per hour and that the driver of the vehicle wishes to establish direct drive between the driving and driven shafts for the purpose of acquiring a quicker acceleration of the vehicle, than would be possible through the overdrive and without dropping his speed below forty miles an hour.

Figure 3:
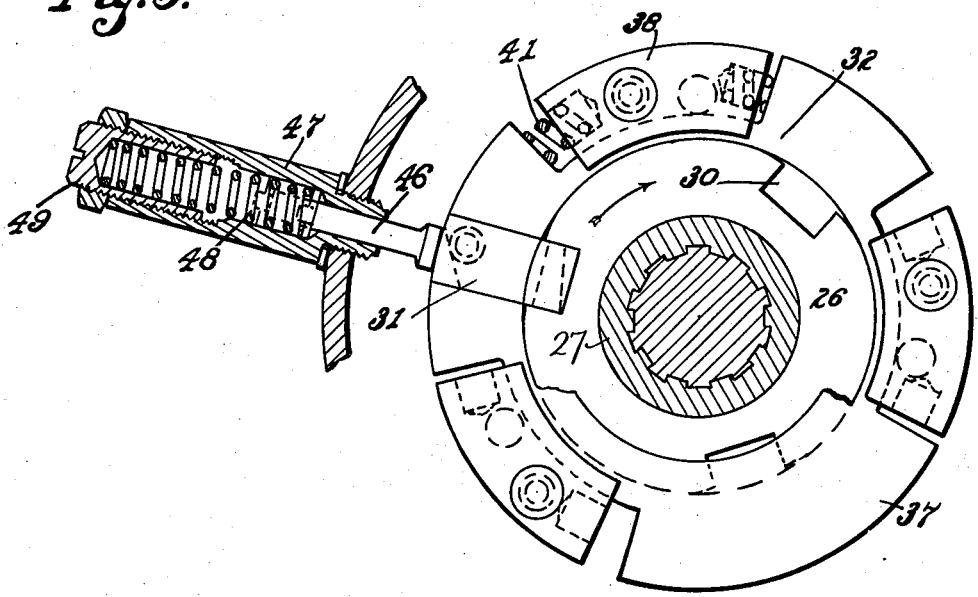
Fig. 3 is a detail section on the line 3—3 of Fig. 1.
Figure 4:
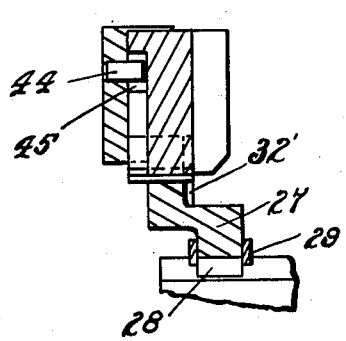
Fig. 4 is a detail section showing certain operative parts.
Figure 5:
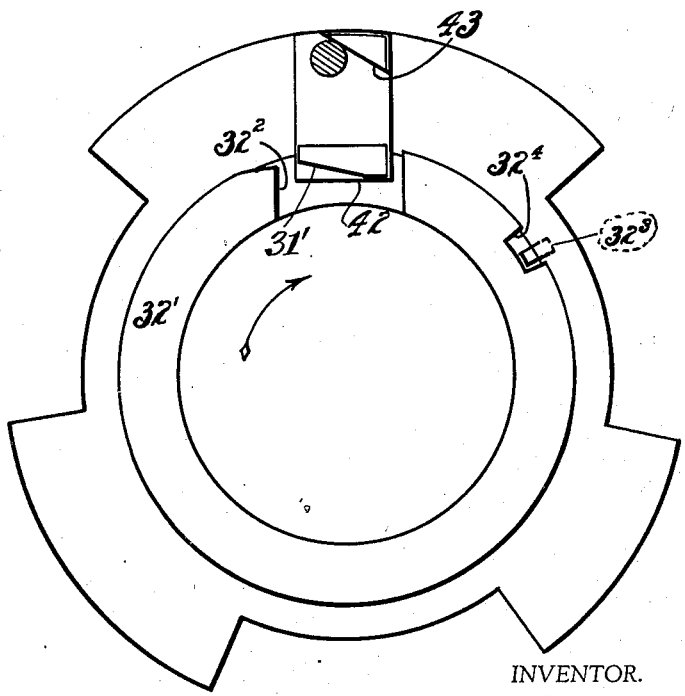
Fig. 5 is a rear elevation of the locking dog.

Under these circumstances, the driver of the vehicle will momentarily throttle the engine by closing his throttle or removing his foot from the accelerator. This will tend to reduce the speed of the shaft 2 and establish or produce a coast load which will tend to rotate the sun gear in a clockwise direction or in the direction of the arrow, looking at Fig. 3. This movement of the sun gear will produce a corresponding movement of the sun gear disc 26 and a like movement of the ring 32 carrying with it the dog 31. Due to the fact that there is practically no load on the dog 31 and due to the fact that the ring 32 is rotating in a clockwise direction, carrying with it the dog 31, the cam 43 will ride on the roller 44, thereby moving the dog 31 radially out of the engaged notch 30 sufficiently to disconnect the disc and permit the sun gear sleeve to rotate in a counterclockwise direction only. If now, the operator suddenly accelerates the engine and with it the shaft 2, there will be a sudden acceleration of the sun gear disc 26 in a counter-clockwise direction and, although there would be a tendency for the ring 32 to rotate in a counter-clockwise direction, there is sufficient inertia in the ring 32 to prevent its following, immediately, the sun gear disc 26 to force the dog 31 back down into the notch 30. Therefore, the sun gear disc will rotate past the dog before it can be seated in the notch. Thereafter, there is a relative movement between the sun gear disc 26 and the dog, which is sufficiently rapid to prevent, due to the cam face at the lower edge of the dog, the dog from engaging in one of the notches 30.

As a further preventive of the re-engagement of the dog 31 with a notch 30 I provide a baulk ring 32' surrounding the hub 27 and having a notch 32² in its periphery to accommodate the dog 31. This ring has frictional engagement with the sun gear disc 26 and has a limited rotation movement therewith, being limited in its movement by a pin 32³ in the ring 32 operating in an elongated notch 32⁴ in the baulk ring. With the dog 31 withdrawn from its engaged notch, the baulk ring 32', because of its frictional engagement with the sun gear disc, will be rotated sufficiently to move beneath the end of the dog 31 to prevent a re-engagement of the dog in a notch 30, and prevent any ratcheting action of the dog while the sun gear is rotating.

When the drive through the overdrive gear train is released as above described, the drive is then direct through the one-way clutch and will continue in direct drive as long as the throttle is maintained in its open position. If, however, it is desired to return to the overdrive, the throttle is again closed, thus permitting the driven shaft to overrun the driving shaft, bearing in mind that the drive is only through the one-way clutch; and the deceleration of the engine and with it the drive shaft 2, causes the sun gear to come to a standstill and then rotate backwards or tend to rotate backwards. With this tendency to rotate backwards, the dog 31 will move downwardly and reengage in one of the recesses 30 to again lock the sun gear against rotation.

It is thus seen that the release and locking up of the sun gear is accomplished purely through the relative rotation of the parts although this relative rotation is controlled through the manipulation of the throttle of the engine.

If, when operating in overdrive relation, the operator of the vehicle desires to slow down somewhat and then desires to again accelerate without going into direct drive through the sun gear release, it is only necessary for him to gradually accelerate. With a slow opening of the throttle or a gradual acceleration of the parts, the pressure of the spring 48 acting against cammed surface 43 of the dog 31 will impart a sufficient counterclockwise acceleration to the ring 32 to cause it to move in unison with disc 26 sufficiently to full re-engage the dog 31.

As illustrated in Figs. 6 and 7, the inner or cam member 10 of the overrunning clutch is provided with a series of flattened faces 50 having recesses 50' formed therein intermediate of the ends of the faces. The rollers 11 are mounted in a cage 51 which extends the entire length of the rollers and at one end is provided with down-turned lugs 52 operating in notches 53' provided in an annular flange 53 formed on the rear face of the cam member 10. These notches are wider than the lugs 52 so that there can be a relative movement between the cage and the cam member to permit the rollers to move into and out of engaging position. At the same time, the relative movement between the cage and its associated rollers and the cam parts of the overrunning clutch, is limited by the lugs 52 so as to provide for a nicety of adjustment of the engagement of the rollers. At the opposite end of the cage, I provide an inner ring 54, one end of which is connected to the cam member 10 and the other end to the cage 51. This ring is preferably formed of wire and has a tendency to contract so as to move the cage and rollers into engaging position. A second wire ring 54' has one end in engagement with the cage and this ring is expanded so that it will have frictional engagement with the inner surface of the outer clutch member. When there is a relative rotation between the outer clutch member and the inner clutch member 10, with the outer clutch member rotating in the direction of the arrow, that is, with the clutch operating towards overrunning position, the frictional engagement between the ring 54' and the outer clutch member will tend to move the cage, also in the direction of the arrow, moving the rollers into the recess 50' so that the clutch can overrun. However, with the cam member 10 operating in the opposite direction relatively to the outer member and thus becoming the drive member, there will be a tendency for the inner ring 54, due to its connection with the cam member, to wind up on the cam member and pull the cage 51 around to cause the rollers to move in their engaging position. This construction insures the engagement and release of the overrunning clutch in a more satisfactory manner than if friction between the rollers and the outer member of the clutch alone were relied on, and furthermore, prevents engagement of the overrunning clutch prematurely.

In the structure illustrated in Fig. 8, I have illustrated certain modifications, in the form of additional dogs, of the structure illustrated in Fig. 2, although in this structure, the baulk rings, to be hereinafter described, are substantially the same as the baulk rings adapted to be used in the structure illustrated in Fig. 2. Referring first to the baulk rings, the head 9 is provided with a peripheral groove on the face adjacent to the peripheral groove 55 on the face adjacent the dogs, providing an annular shoulder 56 on which is mounted a flat ring 57 in frictional engagement with the annular extension 13 of ring gear 12. This ring overhangs the dogs and is provided at suitable intervals with notches 58 to accommodate such dogs as are used, one notch being provided for each dog. Due to the frictional engagement of the baulk ring 57 with the annular extension 13, any rotation of the extension 13 relative to the head 9 will impart a limited movement of the baulk ring in either direction, this limited movement being permitted by an elongated slide 59 in the baulk ring in which the limiting pins 60 operate.

A second or inner baulk ring surrounds the end of the cam member 10 and this ring 61 is of the split ring type, being more disc-like in shape and is in frictional engagement with the cam hub 10. The ring is so positioned that it is in the path of the inner movement of the dogs, and to accommodate the dogs, it is provided with notches 61'.

Figure 2:
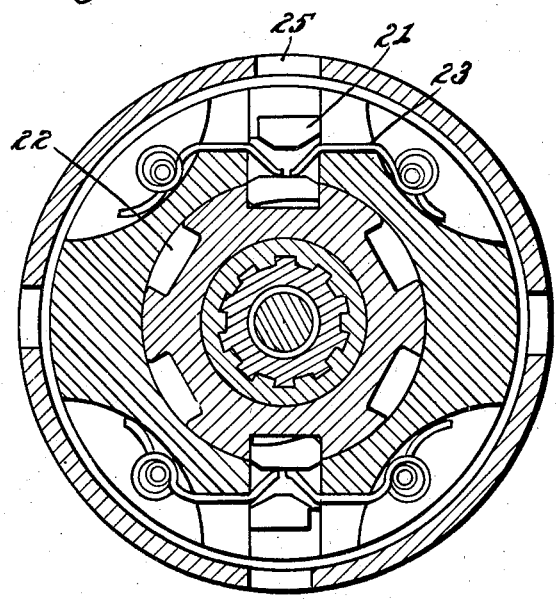
Fig. 2 is a transverse section on the line 2—2 of Fig. 1.

In the structure illustrated in Fig. 8, in addition to the two dogs 21 disclosed in Fig. 2, I have illustrated an additional dog 62 and for the purpose of understanding more fully the operation of the structure, one of the dogs 21 may be designated as the "A" dog, the second dog may be designated as the "B" dog, and the dog 62 may be designated as the "C" dog. One of the springs 23A operating on the A dog, is a comparatively strong spring and for the purpose of illustration, exerts, we will say, a pressure of six pounds. The other spring 23D is a comparatively weaker spring and exerts, we will say, a pressure of three pounds. One of the springs 23C, operating on the B dog, is a relatively strong spring, exerting, say, a pressure of six pounds while the opposite spring 23D is a relatively weak spring exerting, say, a pressure of three pounds. The spring 23C is limited in its inward movement, by a limiting pin 63 so that after the B dog has moved inwardly under the combined action of the two springs 23C and 23D, the further inward movement or pressure on the dog is exerted only by the weak spring 23D. The spring 23E, operating on the C dog, is still weaker than the other springs, and its retracting effect is such that it will not tend to retract the C dog until the speed of the vehicle has dropped below five miles per hour.

The operation of the device is as follows:
We will assume that the parts are in direct drive position, that is, the dogs A, B and C are in their retracted position and are engaged in the notches or recesses 22 in the cam member 10. With the dogs in this position, the cam member 10 being rotatively fixed on the drive shaft 2 and the head 9 being rotatively fixed on the driven shaft 5, there is a direct drive between the shafts through the dogs. Under these circumstances, bearing in mind that the ring gear 12 is being driven through the planetary gearing but is disconnected from the head 9, the sleeve 13 and associated notches 25 will be rotating in the direction of the arrow, shown in Fig. 8, faster than the head 9 and its associated dogs. When the speed of the driven shaft and its associated head 9, together with the dogs, reaches the point where the vehicle is driving at 40 miles an hour, the overdrive engaging speed, centrifugal force will overcome the springs holding the dogs in their retracted position, moving the dogs outwardly to what may be termed "neutral position", that is, to a position disengaging the dogs from their respective recesses 22 and in a position to engage in the notches 25 in the ring gear sleeve 13. It must be borne in mind, however, that the sleeve 13 is rotating faster than the head 9 and its associated dogs, so that, due to the construction of the ends of the dogs, they being cammed, as illustrated, the dogs will not engage, but the cammed surfaces will cause the dogs to ride past the notches. As soon, however, as the operator removes his foot from the accelerator, allowing the engine to slow down slightly, the speed of the sleeve or shell 13 will be reduced until it reaches approximately synchronization with the speed of the head 9 and bearing in mind that the dogs are operating under centrifugal force, the dogs A and B will engage, connecting the two parts together and thereby connecting the ring gear with the head 9 and the overdrive. The dog C is so constructed on its end, the cam being so sharp, that in itself, it will never engage in driving connection. However; when the parts become locked together, the dog C can move into its corresponding notch and the parts will assume the position shown in Fig. 8. Bearing in mind that the baulk ring 61 is in frictional engagement with the cam member 10, as soon as the dog A has moved out of engagement with its associated slot 22 in the member 10, this baulk ring will move slightly with the cam member, to a position with a portion of the ring beneath the dog A so that after the dog has been moved to neutral position under the influence of centrifugal force, with the baulk ring moved in position, there will not be a tendency for the dog to chatter or tend to ride back into its recess in the member 9. It will further be noted that the end of this dog is slightly inclined, permitting ready slipping under the lower edge of the dog of the baulk ring. The recesses in the baulk ring for the accommodation of the dogs C and B are made sufficiently large so that at no time will the baulk ring be in the path of these dogs. It is not so necessary to block the retractive movement of these dogs because their retractive springs, after they have moved out of engagement with the recess 22, have not the same retractive force as the springs 23A and the springs 23B operating on the dog A. It will be remembered that the pin 63 relieves the spring 23C of any pressure on the dog when it is in direct drive engaged position and until after it is moved into overdrive engaged position.

Assuming now, that the driver, with the parts in position illustrated in Fig. 8, slows down the car by removing his foot from the accelerator, and assuming, for the purpose of argument, that the throwout speed for the dogs is 30 miles an hour, when this speed has been reached, if there is a continued coast load on the dogs, even at this speed, the dogs will not retract. Assume, however, as the driver accelerates with the mere touch of the accelerator pedal, this coast load is relieved and due to the fact that the springs 23A and 23B exert a stronger pressure on the dog A, the dog A will first be moved out of engagement with its corresponding notch 25 in the ring 13 and be moved inwardly to "neutral position", that is, out of engagement with the notch 25 but not into engagement with the recess or notch 22, it being borne in mind that the baulk ring is still obstructing the entry of the dog into its recess 22. The dog B will also simultaneously move out of engagement with its associated slot or recess 25 but as soon as it has moved inwardly sufficiently for the spring 23C to engage the pin 63, the retractive force is decreased so that at approximately the 30 mile an hour speed, it will be more or less in a balance. This will permit a slight rotation of the driving shaft in driving direction, and with it the member 10, so as to drag the baulk ring out of the path of the dog A. It must be borne in mind that this movement is permitted because of the fact that the dog C will never engage in a driving direction and also because of the fact that due to the operation of the spring 54′ there is a slight lost motion in the overrunning clutch which will permit this relative movement between the cam member 10 and the head 9. This movement is sufficient to clear the baulk ring and position the parts so that the dog will drop into its recess 22 in the cam member 10 and a direct drive will be established between the cam member 10 and the head 9 through the dog A. With a slight further drop of the speed, the dog B will engage in its associated recess 20 so that the final direct drive will be on the two dogs.

The dog C is more or less of a safety factor. As before stated, it will never have driving engagement in the overdrive ratio in a forward direction. It can, and does, have a coasting engagement between the sleeve 13 and as before stated, the spring 23E is so weak that the dog will tend to move into engaging position under centrifugal force even though the speed of the vehicle is as low as 5 miles per hour. This dog is primarily provided for a lock-up for emergency conditions where, if, for any reason, a quick emergency stop is made without the driver remembering to slightly accelerate. Under these conditions, the dog C would move into one of its recesses 22 as soon as the car came to substantially a stop and insure a driving connection between the driving and driven shaft in event it be desired to drive in reverse direction. This latter function supplements a similar function of dog B.

The baulk ring 57, when the parts are in direct drive, bearing in mind that the member 13 is rotating faster than the head 9, has been moved around, due to its frictional engagement with the member 13, until it is in blocking position to prevent the engagement of the dogs in the slots or recesses 25. This prevents a tendency on the part of the dogs to chatter when they have been moved out to their engaging position. As soon, however, as the speed of the member 13 has been permitted to slow down, upon the operator taking his foot off of the accelerator for the purpose of establishing overdrive relation, this baulk ring will move around to a position to permit the engagement of the dogs.

I have found that in direct drive, due to the fact that there is no load on the planetary gearing, there is sometimes a noise or vibration set up in this gearing which is objectionable. In order to overcome this, I provide a drag ring 64 which is interposed between the head 9 and the sleeve or ring 13. This ring, as will be noted in Fig. 9, is slightly flattened throughout its periphery to provide a slight frictional engagement between the head 9 and the sleeve 13 to cause a drag on the ring gear 12 and impose, therefore, a very slight load on the planetary gearing. This load is not sufficient to have any decided effect on the operation of the parts but is sufficient to prevent a rattle or hum set up in the gears. Due to the fact that the cross sectional area of the ring is slightly smaller than the cross sectional area of the groove in the head 9, the frictional drag is provided more by the distortion of the ring than by the tightness of the fitting of the parts and, therefore, even though the metal of the ring slightly expands, due to heating, under operation, this ring will never expand sufficiently to bind the parts.

I claim as my invention:

1. The combination with a driving shaft and a driven shaft, of a planetary gearing for establishing a driving connection between said shafts including a sun gear, means for holding said sun gear against rotation, means operated by a coasting load on said sun gear for releasing said sun gear holding means and means for preventing a re-engagement of said holding means upon the establishment of a driving load.

2. The combination with a driving shaft and a driven shaft, of means for establishing a one to one drive between said shafts, a planetary gearing for establishing a different speed drive between said shafts, and means operated by a deceleration and then sudden acceleration of the driving shaft when said planetary gearing is driving said driven shaft at a different speed than the driving shaft for operating said gearing to establish a one to one drive between said shafts.

3. The combination with a driving shaft and a driven shaft, of a planetary gearing for establishing a driving connection between said shafts including a sun gear, means for holding said sun gear against rotation, means operated by a deceleration of the driven shaft for releasing said holding means and means for preventing a re-engagement of said holding means upon an acceleration of the driven shaft.

4. The combination with a driving shaft and a driven shaft, of a planetary gearing for establishing a driving connection between said shafts including a sun gear, means for holding said sun gear against rotation, and means operated by a deceleration of the driving shaft for releasing said holding means and maintaining said holding means in its released position, by a sudden acceleration of the driving shaft.

5. The combination with a driving shaft and a driven shaft, of a planetary gearing for establishing a driving connection between said shafts including a sun gear, means for holding said sun gear against rotation, and means operated by a deceleration of the driving shaft for releasing said holding means and maintaining said holding means in its released position by a sudden acceleration of the driving shaft, said means being again engaged by a deceleration of the driving shaft and maintained engaged by a gradual acceleration of the driving shaft.

6. The combination with a driving shaft and a driven shaft, of a planetary gearing for establishing a driving connection between said shafts including a ring gear and a sun gear, automatic means for connecting said ring gear to the driven shaft to render said gearing drivingly effective, means for holding said sun gear against rotation, and means operated by a coasting load upon said sun gear for permitting a direct drive between said shaft without affecting said automatic means.

7. The combination with a driving shaft and a driven shaft, of an overrunning clutch for establishing a one to one one-way drive between said shafts, a planetary gearing for establishing a different speed drive between said shafts including a sun gear, automatic means for establishing a two-way one to one drive between said shafts or establishing a different speed drive between said shafts through said gearing, means for holding said sun gear against rotation, and means operated by a coasting load on said sun gear for releasing said holding means to permit the establishment of a one to one drive between said shafts through said overrunning clutch and without affecting said automatic means.

8. The combination with a driving shaft and a driven shaft, of a planetary gearing for establishing a driving connection between said shafts including a sun gear, a holding member for holding said sun gear against rotation, and means having a limited rotating movement with said sun gear in either direction and operating to release said holding means when rotating with the sun gear in one direction.

9. The combination with a driving shaft and a driven shaft, of a planetary gearing for establishing a driving connection between said shafts, including a sun gear, means for holding said sun gear against rotation, means operated by a reverse drive of said sun gear for releasing holding means and means for preventing a re-engagement of said holding means upon a forward drive upon said sun gear.

10. The combination with a driving shaft and a driven shaft, of a planetary gearing for establishing a driving connection between said shafts including a sun gear, means for holding said sun gear against rotation, and means operated by a reverse drive of said sun gear for releasing said holding means, and means operated by relatively rapid movement between said holding means and said sun gear upon a forward drive of said sun gear for preventing said holding means from re-engaging.

11. The combination with a driving shaft and a driven shaft, of a planetary gearing for establishing a driving connection between said shafts including a sun gear, a dog for holding said sun gear against rotation, and means frictionally driven with said sun gear for a limited distance for causing said dog to move to releasing position.

12. The combination with a driving shaft and a driven shaft, of a planetary gearing for establishing a driving connection between said shafts including a sun gear, of a dog for holding said sun gear against rotation, operating means for said dog, having a limited movement in either direction with said sun gear, and frictionally driven by said sun gear, said means when moved by said sun gear in one direction effecting a release of said dog and when moved by said sun gear in a reverse direction, effecting an engagement of said dog.

13. The combination with a driving shaft and a driven shaft, of a dog for holding said sun gear against rotation, operating means for said dog, having a limited rotative movement in either direction and frictionally driven by said sun gear, said means, when moved by said sun gear in one direction, effecting a disengagement of said dog, and when rotated in an opposite direction by said sun gear, effecting an engagement of the dog, said dog being so constructed that a relatively rapid rotation of the sun gear in disengaging direction, and after the dog has been disengaged, will prevent re-engagement of the dog.

14. In a transmission, the combination with a driving shaft and a driven shaft, of a planetary gearing for driving said driven shaft at a greater speed than the driving shaft including a normally rotatively stationary sun gear, pinion gears meshing with said sun gear and drivingly connected with said driving shaft, a ring gear, an automatic clutch for connecting said ring gear to the driven shaft when the speed of the driven shaft reaches a predetermined point, and means for imparting a friction drag between said ring gear and said driven shaft when the automatic clutch is disconnected.

15. In a transmission, the combination with a driving shaft and a driven shaft, of a gearing for drivingly connecting said shafts to drive the driven shaft at a different speed from the driving shaft and including a gear adapted for connection with the driven shaft, an automatic clutch for connecting said driven shaft to said gear including a plurality of radially movable dogs, means for biasing said dogs in a disengaging position, the biasing effect of the biasing means for each dog being different than that of the remaining dogs.

16. In a transmission, the combination with a driving shaft and a driven shaft, of a gearing for drivingly connecting said shafts to establish a driving connection between said shafts and including a gear adapted for connection with the driven shaft, an automatic clutch including a plurality of centrifugally operated radially movable dogs which, in one position, establish a direct connection between said shafts, and in another position, establish connection between driven shaft and said gear, means for biasing said dogs in a direction to establish the direct connection, the biasing means of each dog having a different effect than that of the remaining dogs.

17. The combination with a driving shaft and a driven shaft, of a gearing for establishing a driving connection between said shafts, automatic means for rendering said gearing operative to establish said different speed drive, and means operated by the deceleration and then sudden acceleration of the driving shaft for establishing a one to one drive between said shafts without affecting said automatic means.

WILLIAM B. BARNES.